Sept. 13, 1949.  A. C. PETERSON  2,481,867
MOTOR AND CLUTCH UNIT
Filed Jan. 24, 1948  3 Sheets-Sheet 1
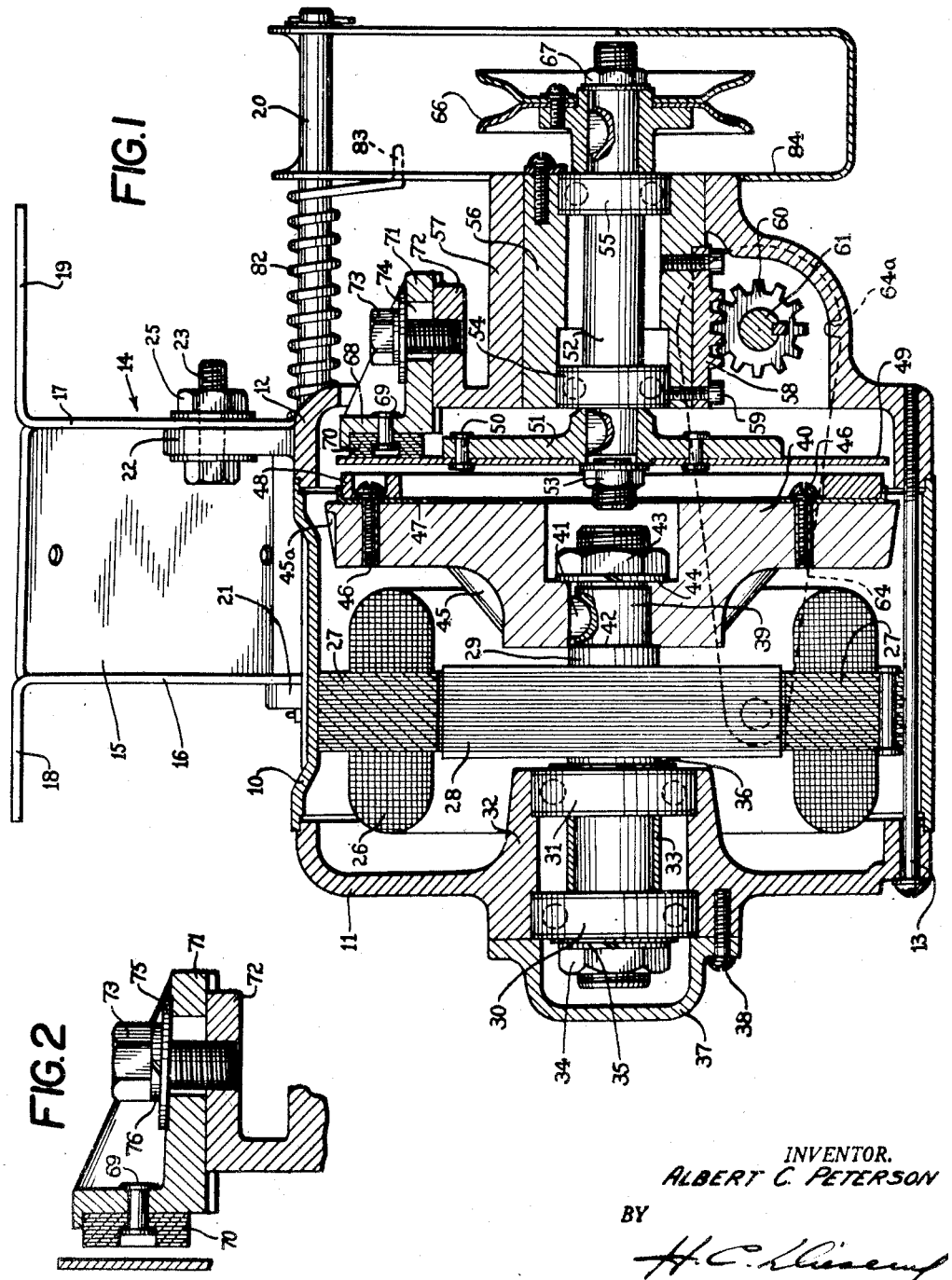
INVENTOR.
ALBERT C. PETERSON
BY
*H. C. Kinney*
ATTORNEYS Sept. 13, 1949. A. C. PETERSON 2,481,867
MOTOR AND CLUTCH UNIT
Filed Jan. 24, 1948 3 Sheets-Sheet 2

INVENTOR.
ALBERT C. PETERSON
BY
ATTORNEYS

Sept. 13, 1949.  A. C. PETERSON  2,481,867
MOTOR AND CLUTCH UNIT

Filed Jan. 24, 1948  3 Sheets-Sheet 3

INVENTOR.
Albert C. Peterson
BY
H. C. Cheney
ATTORNEY.

Patented Sept. 13, 1949

2,481,867

UNITED STATES PATENT OFFICE 2,481,867

MOTOR AND CLUTCH UNIT

Albert C. Peterson, Park Ridge, Ill., assignor to Union Special Machine Company, Chicago, Ill., a corporation of Illinois Application January 24, 1948, Serial No. 4,087

19 Claims. (Cl. 172—36)

This invention relates to an electric motor and clutch unit of the type particularly adapted for use in the driving of sewing machines. Such machines are set into operation and stopped at frequent intervals in forming a succession of seams. In the operation of industrial sewing machines, at the high speeds now commonly employed, each seaming operation requires but a few seconds, so that the machines are started and stopped many times in the course of a day. When the machines are equipped with their individual electric motors, these are kept constantly running and the starting and stopping of the machines is effected by the operation of a clutch. It is important, for uniformity of results, to bring a machine quickly to its desired speed at the commencement of each operation and to bring it quickly to a stop upon the completion of each seam. For the latter purpose a brake is usually provided to arrest the driven element of the clutch as the clutch is released.

A primary object of the present invention has been to provide a compact and light-weight motor and clutch unit adapted for hard and continuous service of the character indicated.

Another object has been to provide a unit of the type specified which will quickly bring the driven machine up to maximum speed and which will quickly stop the machine upon release of the clutch.

A further object has been to provide a motor and clutch unit which is of simple construction and one which may be readily assembled, disassembled, and kept in repair. Toward this end, as a special feature of the invention, the main shaft of the motor is supported adjacent only one end and projects in cantilever fashion from the bearings.

Another object has been to provide a simple arrangement for supporting and adjustably clamping a brake member which serves to stop the driven machine abruptly upon release of the clutch. This arrangement is such that adjustment of the brake is effected by loosening a single screw or bolt. Retightening of the screw, after adjustment of the brake member, serves to clamp and effectively lock the brake member.

A still further object has been to provide a simple form of guard around the driven pulley of the unit to prevent the garment of the operator, or the goods being sewed, from becoming caught between the pulley and belt. The guard arrangement is such, moreover, that access to the pulley may be quickly and readily had, so that the belt may be removed or changed expeditiously.

An advantageous feature of the invention is the provision of a sheet metal hanger for supporting the unit from the under surface of a table, the arrangement being such that a very simple and effective means is provided for adjusting the position of the unit in relation to the hanger for belt tightening or releasing purposes.

Other objects, features, and advantages of the invention will appear from the detailed description of an illustrative form of the same, which will now be given in relation to the accompanying drawings in which:

Fig. 1 is a vertical sectional view along the axis of a motor and clutch unit embodying the invention;

Fig. 2 is an enlarged detail view showing the mounting of a brake element embodied in the unit;

Figure 3:
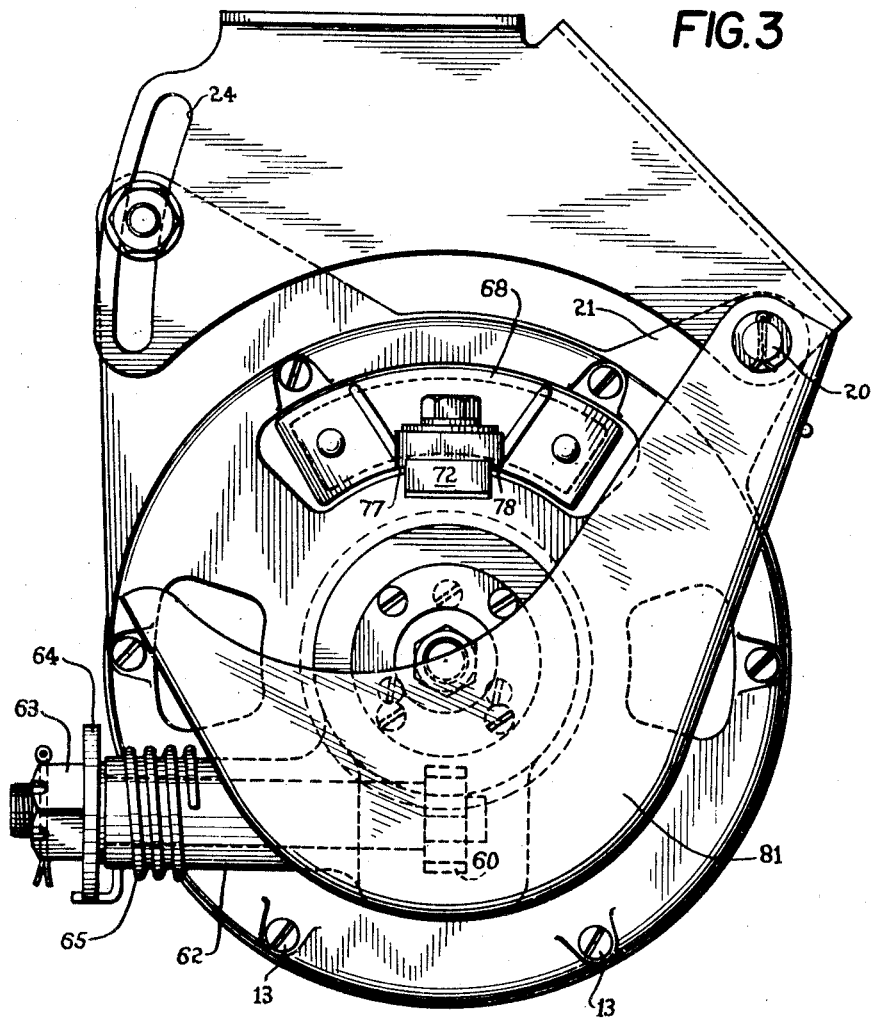
Fig. 3 is an end elevational view of the unit taken from the righthand end of Fig. 1.
Figure 5:
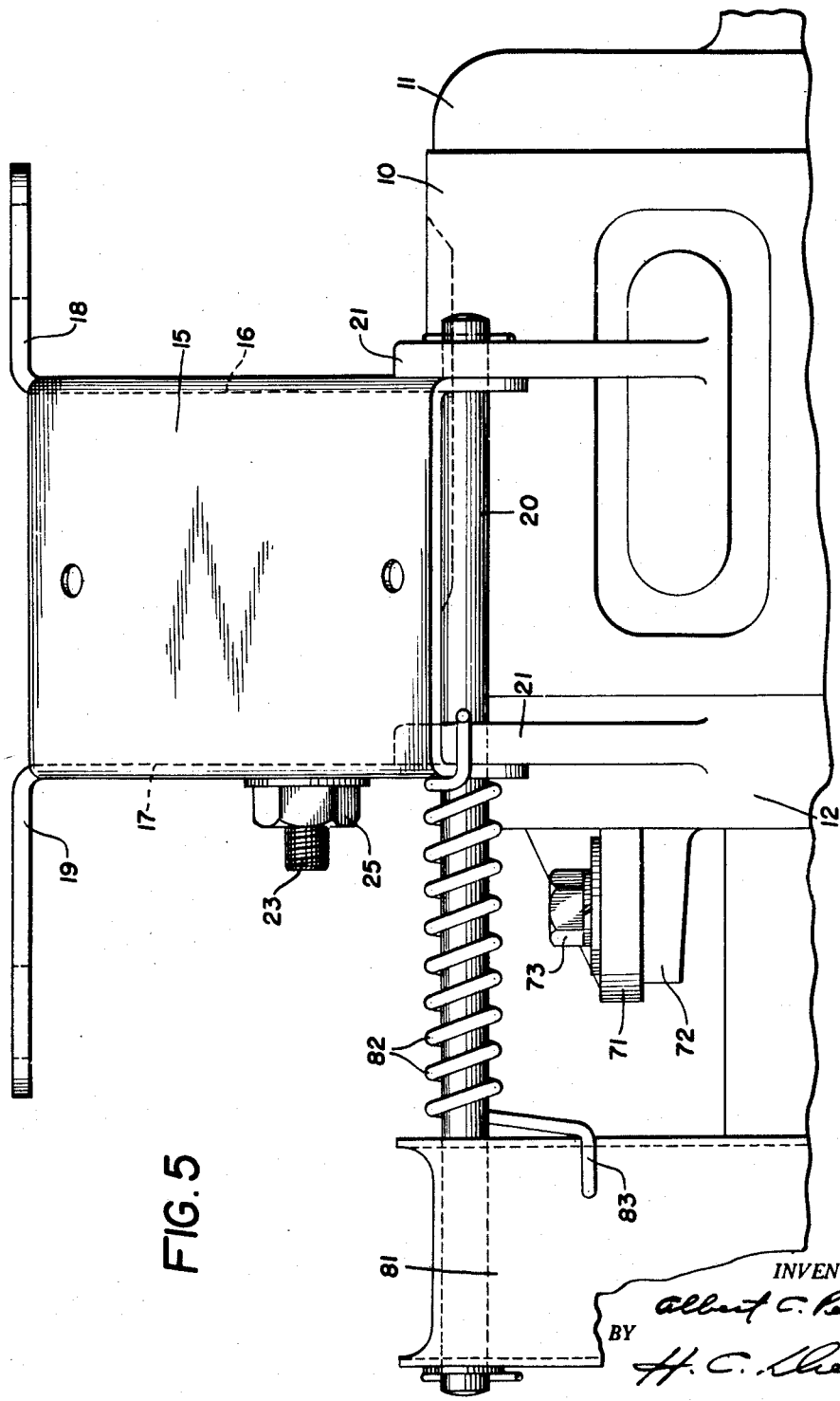
Fig. 5 is a detail view, in rear elevation, showing the supporting bracket and upper portion of the unit.

Referring now to the drawings, the unit comprises a housing having a main, substantially cylindrical portion 10 and a pair of end bonnets 11 and 12, all held together by a series of long screws 13 (Figs. 1 and 3). The housing is arranged to be suspended from the under surface of a table (not shown) by means of a bracket, indicated generally at 14 in Fig. 1. This bracket is of simple, light and inexpensive construction and is preferably formed of sheet metal. It comprises an inclined back member 15 which serves to interconnect two vertically disposed side members 16 and 17. The upper portions of the side members are bent laterally to provide horizontally extending wings 18 and 19, which are suitably apertured to receive screws, or bolts, by which the bracket may be secured to the under surface of the table. The side members 16 and 17 are apertured at a point adjacent the member 15 to receive a rod 20 which also passes through an upwardly and rearwardly extending ear or lug 21 carried by the central portion 10 of the housing and a similar lug 21 carried by the end bonnet, as shown in Fig. 5. Thus, the housing of the unit is pivotally connected, at a point above and in rear of its axis, with the bracket 14. An upwardly extending ear 22 integral with the end bonnet 12 is disposed adjacent the inner face of the member 17 and carries a bolt 23 which passes through an elongated arcuate slot 24 in the member 17. Slot 24 has its center of curvature along the axis of the rod 20. By loosening a nut 25 on the bolt 23 angular adjustment of the housing in relation to the bracket 14 is permitted, for belt tightening and removing purposes and the like.

Within the housing member 10 there is mounted an electric motor having a stationary field formed by a coil or winding 26 and electromagnetic elements 27. Within this field is rotatably mounted an armature or rotor 28 which is secured to a shaft 29. This motor may be of conventional constuction, so far as its electrical circuits are concerned. The shaft 29 is journalled in a pair of spaced bearings 30 and 31, of any suitable construction but preferably ball-bearings, mounted within a hub or sleeve-like extension 32 at the center of the end bonnet 11. A spacing sleeve or collar 33 is provided on the shaft 29 between the bearings 30 and 31. The inner raceways for the ball bearings are held in assembled relation on the shaft by means of a nut 34 and a lock washer 35 at the lefthand end of the shaft. Nut 34, which cooperates with threads at the outer end of the shaft, serves to clamp the raceways and the spacing sleeve 33 by forcing them toward the right (Fig. 1) until the inner raceway of bearing 31, or a cooperating washer, engages a shoulder on the shaft provided by an enlargement 36 thereof. The outer raceways for the bearings 30 and 31 are retained in any suitable way in recesses within the hub extension 32. A cap 37 is mounted on the outer end of the hub 32 to enclose the outer end of the shaft. This cap may be suitably secured to the end bonnet 11 by screws 38. The arrangement is such that the rotor or armature carrying shaft 29 is supported wholly by the bearings 30 and 31, in cantilever fashion.

At the opposite or righthand end of the shaft 29 there is mounted, upon a reduced portion 39, a flywheel 40 formed of cast iron or steel or any other suitable material. This flywheel is connected to the shaft, for rotation with it, by means of a key 41 and is held against the shoulder 42 on the shaft by means of a nut 43 and lock washer 44. The end of the shaft is suitably screw threaded to receive the nut 43. Fins 45 may be provided on the inner face of the flywheel and fins 45a around its periphery. These induce a suitable flow of air through the motor and thus keep the latter cool. To the outer face of the flywheel there is secured, by means of screws 46, a steel plate 47 having fastened thereto, in any suitable way, a clutch lining 48, the plate and lining both being annular in form.

Cooperating with the clutch lining 48 is a disc 49 forming part of the driven clutch element. This disc, preferably formed of steel, is secured by rivets 50, or the like, to a smaller disc 51 formed either of cast iron or aluminum or other suitable material and which is keyed to the outer end of a driven shaft 52. A nut 53, cooperating with screw threads at the outer end of the shaft 52, serves to retain the disc 51 thereon. Shaft 52 is carried by suitable bearings 54 and 55, preferably ball-bearings, mounted within a sleeve 56 which is axially movable within a hub or sleeve like extension 57 of the end bonnet 12. To the under surface of the sleeve 56 there is secured a rack 58 which is held in place by screws 59 and serves the dual function of a driving member for the sleeve and a key for preventing rotation of the sleeve in relation to the hub 57. It will be understood that the rack fits into a key slot formed in the hub and is held within a key slot formed in the sleeve. In this respect it is similar to the rack 118 of the pending application of George Sauer and Clarence C. Smith, Serial No. 638,186, filed December 29, 1945. Rack 58 is arranged to be driven through a limited distance by means of a pinion 60 secured and keyed to a shaft 61 extending transversely of the hub 57 through another sleeve-like extension 62 of the end bonnet 12 to the forward face of the unit. Adjacent the outer end of the shaft 61 there is secured thereto, by means of a nut 63, an arm 64 which, as shown in Fig. 1, extends substantially parallel with the shafts 29 and 52. The outer end of this arm is adapted to be connected by a rod or the like (not shown) with any suitable operating means, such as a foot treadle. A spring 65 surrounding the extension 62, having one end inserted in a small aperture in said extension and its opposite end engaged in a notch 64a in the periphery of the arm 64, serves to rock the latter in a clockwise direction (Fig. 1). It will be seen from the foregoing that rocking of the arm 64 in a counterclockwise direction against the action of the spring 65 will serve to shift the sleeve 56 toward the left (Fig. 1) and will carry the driven clutch disc 49 against the clutch lining 48, thus bringing about rotation of the shaft 52. A pulley 66 is keyed to the outer or righthand end of the shaft 52 and is secured thereto by means of a nut 67. This pulley is adapted to be connected by a belt with a pulley on the machine to be driven, such as a sewing machine.

Since, as explained above, it is desirable to quickly arrest the operation of a sewing machine upon the completion of a seam, a brake member is provided for cooperation with the outer face of the driven clutch disc 49 as the latter is shifted away from the clutch lining 48. The brake member comprises a bracket having a segmental portion 68 (Figs. 1 and 3) carrying on its inner face, by means of rivets 69 or the like, a suitable brake lining 70. The segment 68 has, adjacent its center, a horizontally and outwardly extending part 71 having a flat under surface adapted to slidably support the bracket on the upper surface of a shelf-like projection 72 extending outwardly from the outer face of the end bonnet 12. A bolt or screw 73, having a screw-threaded engagement with an aperture in the shelf 72, passes through an elongated slot 74 in the part 71. A relatively large washer 75 cooperates with the upper face of the part 71 and a lock washer 76 is provided between the head of the bolt 73 and the washer 75. This arrangement is such that the brake element may be adjusted on the shelf 72 in a direction parallel with the axis of the shaft 52, so as to bring about prompt engagement of the brake by the disc 49 upon its disengagement from the clutch lining 48. Due allowance may be made for wear of the friction faces by adjustment of the brake member from time to time. A segmental opening through the end wall of the bonnet 12, of slightly larger area than the portion 68 of the brake member, enables the latter to be readily inserted and removed.

In the operation of the motor and clutch unit the operator, in order to stop the driven sewing machine quickly upon the completion of a seam, will customarily rock the treadle, which is connected with the operating arm 64, in the clutch disengaging direction by the pressure of the heel. A considerable force is, therefore, frequently exerted upon th arm 64, tending to shift the sleeve 56 toward the right in Fig. 1 to carry the clutch disc 49 forcibly against the brake element. It is important, for this reason, to lock the brake member effectively against movement toward the right in Fig. 1. This is accomplished in a very simple manner by the present invention through the provision of a slight wedge angle between the upper and lower faces of the part 71. As best shown in Fig. 2 this very effectively prevents movement of the brake member toward the right once the bolt 73 has been tightened. The wedging action could, of course, be provided in other ways, but the arrangement illustrated is preferred.

Figure 4:
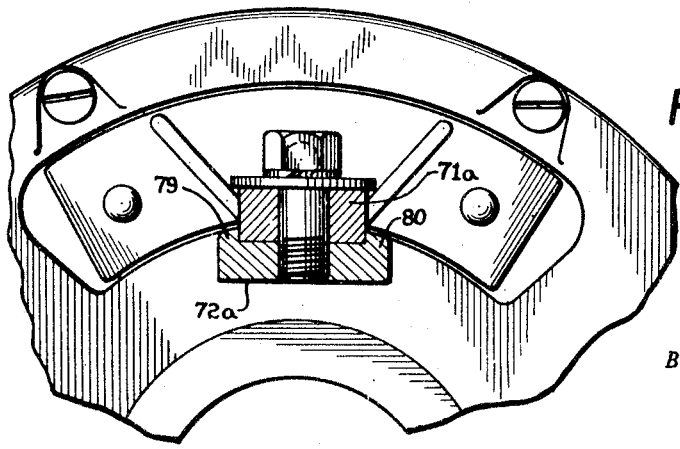
Fig. 4 is an enlarged detail view, partly in end elevation and partly in section, of a portion of a modified construction showing a different mode of mounting the brake element.

To prevent turning of the brake member on the shelf 72 as the driven clutch disc engages the brake lining, the part 71 may be provided with downwardly extending flanges 77 and 78 arranged to engage the side faces of the shelf 72. In lieu of this arrangement the modified construction shown in Fig. 4 may be employed. As here shown, a channel is formed in the shelf 72a by providing the latter with upwardly extending flanges 79 and 80 along its side edges arranged to cooperate with the sides of the part 71a of the brake member. In other respects the construction of Fig. 4 may be substantially identical with that of Figs. 1 to 3.

In order to safeguard the operator of the machine against catching of her clothing, or the work being operated upon, by the pulley 66 and the belt which it drives, a guard 81 is preferably employed. This guard surrounds somewhat more than 200° of the circumference of the pulley over the area which is most likely to come in contact with the clothing of the operator and the work. In accordance with the invention the guard is simply pivotally mounted upon the unit so that it may be readily swung out of protecting position to one providing full access to the pulley and belt. For this purpose one leg of the substantially J-shaped guard is extended and adapted to receive the outer end of the rod 20. The latter, as shown in Fig. 1, extends a sufficient distance from the outer face of end bonnet 12 for this purpose. A spring 82, surrounding the rod 20 and having one end inserted in an aperture in the end bonnet and its other end 83 engaged in rear of the upwardly extending leg of the guard, serves to rock the latter into its protecting position. Movement of the guard under the influence of the spring is limited by the engagement of the edge 84 thereof with a portion of the hub 57. It will be appreciated that a relatively light pressure of the finger on the outer end of the free leg of the guard will serve to rock the latter out of its protecting position to one in which the pulley is fully exposed.

While an illustrative form of the invention has been disclosed in considerable detail and certain variations have been suggested, it will be understood that other changes may be made without departing from the general principles and scope of the invention. If desired, an outlet may be provided on the transmitter for the reception of a plug connected with a small electric lamp mounted at a convenient point on the sewing machine. Other accessory devices may be added, if desired.

What I claim is:

1. A motor and clutch unit which comprises a housing, means in said housing providing a field for an electric motor, an armature mounted for rotation within said field, a shaft supporting said armature, bearing means for said shaft disposed wholly at one side of said armature, said shaft having a part projecting from said armature at its opposite side, and a driving element of a clutch secured to said projecting part of said shaft.

2. A motor and clutch unit which comprises a housing, means in said housing providing a field for an electric motor, an armature mounted for rotation within said field, a shaft supporting said armature, bearing means for said shaft disposed wholly at one side of said armature, said shaft having a part projecting from said armature at its opposite side, a driving element of a clutch secured to said projecting part of said shaft, a second bearing means carried by said housing at said opposite side of said armature, a second shaft rotatably carried by said second bearing means, a driven clutch element carried by said second shaft for rotation therewith, and means for shifting said driven clutch element axially into and out of engagement with said driving element.

3. A motor and clutch unit which comprises a housing, means in said housing providing a field for an electric motor, an armature mounted for rotation within said field, a shaft supporting said armature, bearing means for said shaft disposed wholly at one side of said armature, said shaft having a part projecting from said armature at its opposite side, a driving element of a clutch secured to said projecting part of said shaft, a second bearing means carried by said housing at said opposite side of said armature, a second shaft rotatably carried by said second bearing means, a driven clutch element carried by said second shaft for rotation therewith, means for shifting said driven clutch element axially into and out of engagement with said driving element, and a brake member carried by said housing arranged to be engaged by said driven clutch element upon movement thereof out of engagement with said driving element.

4. A motor and clutch unit comprising a motor housing having a plurality of end bonnets, stator and rotor motor elements within said housing, a shaft supporting said rotor element and having parts projecting from opposite sides thereof, bearing means carried by one of said end bonnets at one side of said rotor cooperating with one of said shaft parts and forming the sole support for said shaft, a flywheel secured to the part of said shaft projecting from the opposite side of said rotor element, driving clutch means carried by said flywheel, a second shaft carried by the other of said end bonnets for axial movement in relation thereto, and driven clutch means carried by said second shaft for movement into and out of engagement with said driving clutch means.

5. A motor and clutch unit comprising a motor housing having a plurality of end bonnets, stator and rotor motor elements within said housing, a shaft supporting said rotor element and having parts projecting from opposite sides thereof, bearing means carried by one of said end bonnets at one side of said rotor cooperating with one of said shaft parts and forming the sole support for said shaft, a flywheel secured to the part of said shaft projecting from the opposite side of said rotor element, driving clutch means carried by said flywheel, a second shaft carried by the other of said end bonnets for axial movement in relation thereto, driven clutch means carried by said second shaft for movement into and out of engagement with said driving clutch means, and a brake member carried by said other of said end bonnets arranged to be engaged by said driven clutch means upon movement thereof out of engagement with said driving clutch means.

6. A motor and clutch unit comprising a motor housing having a plurality of end bonnets, stator and rotor motor elements within said housing, a shaft supporting said rotor element and having parts projecting from opposite sides thereof, a sleeve-like hub integral with one of said end bonnets, a plurality of spaced bearings carried by said hub at one side of said rotor element and cooperating with one of the parts of said shaft to provide the sole support for said shaft and rotor element, and a flywheel carried by another part of said shaft projecting from the other side of said rotor element.

7. A motor and clutch unit comprising a motor housing having a plurality of end bonnets, stator and rotor motor elements within said housing, a shaft supporting said rotor element and having parts projecting from opposite sides thereof, hub means integral with each of said end bonnets, spaced bearings carried by one of said hub means at one side of said rotor element forming the sole support for said shaft, a driving clutch element carried by said shaft on the other side of said rotor element, an axially shiftable shaft carried by the other of said hub means, and a driven clutch element carried by said axially shiftable shaft arranged to engage said driving clutch element upon movement of said axially shiftable shaft in one direction.

8. In a motor and clutch unit a housing, a motor in said housoing having a rotor carrying a driving clutch element, an axially shiftable shaft carried by said housing having secured thereto a driven clutch element arranged to be shifted into and out of engagement with said driving clutch element, a brake element carried by said housing arranged to be engaged by said driven clutch element upon shifting of the same out of enaggerment with said driving element, and a single means for securing said brake element to said housing and locking the same against movement by said driven clutch element.

9. In a motor and clutch unit a housing, a motor in said housing having a rotor carrying a driving clutch element, an axially shiftable shaft carried by said housing having secured thereto a driven clutch element arranged to be shifted into and out of engagement with said driving clutch element, a brake element carried by said housing arranged to be engaged by said driven clutch element upon shifting of the same out of engagement with said driving element, said brake element having a wedge shaped portion engaging a flat portion of said housing, said wedge shaped portion having an elongated opening therethrough, and screw means passing through said opening for securing said brake element adjustably to said housing.

10. In a motor and clutch unit a housing, a motor in said housing having a rotor carrying a driving clutch element, an axially shiftable shaft carried by said housing having secured thereto a driven clutch element arranged to be shifted into and out of engagement with said driving clutch element, a brake element carried by said housing arranged to be engaged by said driven clutch element upon shifting of the same out of engagement with said driving element, said brake element having a wedge shaped portion engaging a flat portion of said housing, said wedge shaped portion having an elongated opening therethrough, screw means passing through said opening for securing said brake element adjustably to said housing, and interengaging means on said brake element and housing for preventing relative turning thereof.

11. In a motor and clutch unit a housing having a main central portion and a pair of end bonnets, a motor in said housing having a rotor carrying a driving clutch element, an axially shiftable shaft carried by said housing having secured thereto a driven clutch element arranged to be shifted into and out of engagement with said driving clutch element, a brake element carried by said housing arranged to be engaged by said driven clutch element upon shifting of the same out of engagement with said driving element, one of said end bonnets having a shelf projecting therefrom, said brake element having a portion supported by said shelf, and means for clamping said portion of said brake element to said shelf, the arrangement being such that the force applied to said brake element by engagement therewith of said driven clutch element produces a wedging action serving to lock said brake element.

12. In a motor and clutch unit a housing having a main central portion and a pair of end bonnets, a motor in said housing having a rotor carrying a driving clutch element, an axially shiftable shaft carried by said housing having secured thereto a driven clutch element arranged to be shifted into and out of engagement with said driving clutch element, a brake element carried by said housing arranged to be engaged by said driven clutch element upon shifting of the same out of engagement with said driving element, one of said end bonnets having a shelf projecting therefrom, said brake element having a portion supported by said shelf, means for clamping said portion of said brake element to said shelf, the arrangement being such that the force applied to said brake element by engagement therewith of said driven clutch element produces a wedging action serving to lock said brake element, and interengaging means on said brake element and shelf for preventing relative turning thereof.

13. In a motor and clutch unit a housing having a main central portion and a pair of end bonnets, a motor in said housing having a rotor carrying a driving clutch element, an axially shiftable shaft carried by said housing having secured thereto a driven clutch element arranged to be shifted into and out of engagement with said driving clutch element, a brake element carried by said housing arranged to be engaged by said driven clutch element upon shifting of the same out of engagement with said driving element, one of said end bonnets having a shelf projecting outwardly therefrom, said brake element having a wedge shaped portion supported by said shelf, and means for clamping said portion of said brake element to said shelf, said clamping means comprising a bolt secured to said shelf and passing through an elongated slot in said brake element.

14. A motor and clutch unit comprising a housing, stator and rotor motor elements within said housing, a shaft journaled in said housing and carrying said rotor element, a driving clutch element carried by said shaft, a second shaft journaled in said housing and shiftable axially thereon, a driven clutch element carried by said second shaft, a pulley secured to said second shaft outside of said housing, and a trough-like guard member having an upwardly extending leg pivotally mounted on said housing above and in rear of said second shaft, said guard member being swingable from a position at least partially surrounding said pulley to a position fully exposing said pulley.

15. A motor and clutch unit comprising a housing, stator and rotor motor elements within said housing, a shaft journaled in said housing and carrying said rotor element, a driving clutch element carried by said shaft, a second shaft journaled in said housing and shiftable axially thereon, a driven clutch element carried by said second shaft, a pulley secured to said second shaft outside of said housing, a trough-like guard member having an upwardly extending leg pivotally mounted on said housing above and in rear of said second shaft, said guard member being swingable from a position at least partially surrounding said pulley to a position fully exposing said pulley, and a spring surrounding the pivot for said guard normally urging said guard into said first mentioned position.

16. A motor and clutch unit comprising a housing, stator and rotor motor elements within said housing, a shaft journaled in said housing and carrying said rotor element, a driving clutch element carried by said shaft, a second shaft journaled in said housing and shiftable axially thereon, a driven clutch element carried by said second shaft, a pulley secured to said second shaft outside of said housing, a rod projecting from said housing parallel with said second shaft and above the same, and a guard member swingable about said rod from a position at least partially surrounding said pulley to a position fully exposing said pulley.

17. A motor and clutch unit comprising a housing, stator and rotor motor elements within said housing, a shaft journaled in said housing and carrying said rotor element, a driving clutch element carried by said shaft, a second shaft journaled in said housing and shiftable axially thereon, a driven clutch element carried by said second shaft, a pulley secured to said second shaft outside of said housing, a rod projecting from said housing above and rearwardly of said second shaft and parallel therewith, a guard member swingable about said rod from a position at least partially surrounding said pulley to a position fully exposing said pulley, and a spring surrounding said rod normally urging said guard into said first mentioned position.

18. In apparatus of the class described an electric motor, a clutch axially alined with said motor, a housing enclosing said motor and clutch, a bracket having a flat plate-like portion and a pair of side portions extending forwardly and downwardly therefrom, a rod carried by said side portions and arranged to pivotally support said housing, an arcuate slot in one of said side portions curved about the axis of said rod, and a bolt carried by said housing and cooperating with said slot to retain said housing adjustably in relation to said bracket.

19. In apparatus of the class described an electric motor, a clutch axially alined with said motor, a housing enclosing said motor and clutch, said clutch including a shaft projecting from said housing and having a pulley secured thereto exterior of said housing, a bracket having a flat plate-like portion and a pair of side portions extending forwardly and downwardly therefrom, a rod carried by said side portions and arranged to pivotally support said housing, an arcuate slot in one of said side portions curved about the axis of said rod, a bolt carried by said housing and cooperating with said slot to retain said housing adjustably in relation to said bracket, and a guard for said pulley swingably mounted on said rod.

ALBERT CHARLES PETERSON.

REFERENCES CITED

The following references are of record in the file of this patent:

UNITED STATES PATENTS

| Number | Name | Date |
|---|---|---|
| 1,652,492 | Naul | Dec. 13, 1927 |
| 1,802,110 | Graham | Apr. 21, 1931 |